(12) United States Patent
Bell (10) Patent No.: US 9,468,220 B2
(45) Date of Patent: Oct. 18, 2016

(54) SYSTEM AND METHOD FOR MAINTAINING PERISHABLE FOODS

(75) Inventor: Laurence D. Bell, Pacific Grove, CA (US)

(73) Assignee: GLOBAL FRESH FOODS, San Francisco, CA (US)

( * ) Notice: Subject to any disclaimer, the term of this patent is extended or adjusted under 35 U.S.C. 154(b) by 0 days.

(21) Appl. No.: 12/914,664

(22) Filed: Oct. 28, 2010

(65) Prior Publication Data

US 2011/0151084 A1 Jun. 23, 2011

Related U.S. Application Data (60) Provisional application No. 61/256,868, filed on Oct. 30, 2009.

(51) Int. Cl.
*A23B 4/16* (2006.01)
*A23L 3/3418* (2006.01)

(52) U.S. Cl.
CPC ............... *A23B 4/16* (2013.01); *A23L 3/3418* (2013.01)

(58) Field of Classification Search
CPC ....... A23B 4/16; A23L 3/001; A23L 3/3418; B65B 31/00
USPC ........ 426/474, 413, 418–419, 118, 231–232, 426/312–313, 316
See application file for complete search history.

(56) References Cited

U.S. PATENT DOCUMENTS

| | | | |
|---|---|---|---|
| 3,437,428 A | 4/1969 | Quesada Camilo et al. | |
| 3,563,757 A * | 2/1971 | Dixon | 99/472 |
| 3,598,518 A | 8/1971 | Goto | |
| 3,937,847 A | 2/1976 | Elkins et al. | |
| 3,992,271 A | 11/1976 | Danzig et al. | |
| 4,039,409 A | 8/1977 | LaConti et al. | |
| 4,212,891 A | 7/1980 | Fujita et al. | |
| 4,311,569 A | 1/1982 | Dempsey et al. | |
| 4,513,066 A | 4/1985 | Simon | |
| 4,609,383 A | 9/1986 | Bonaventura et al. | |
| 4,642,996 A | 2/1987 | Harris et al. | |
| 4,779,398 A * | 10/1988 | Glandon et al. | 53/434 |
| 4,817,391 A | 4/1989 | Roe et al. | |
| 4,895,729 A | 1/1990 | Powrie et al. | |
| 5,438,841 A | 8/1995 | Cahill-O'Brien et al. | |

(Continued)

FOREIGN PATENT DOCUMENTS

| | | |
|---|---|---|
| DE | 4430617 A1 | 2/1996 |
| JP | 55-45386 | 9/1978 |

(Continued)

OTHER PUBLICATIONS

Journal of Food Science; vol. 60; 1995; pp. 571-575. "Dynamic Changes of Headspace Gases in CO, and N, Packaged Fresh Beef"; Yanyun Zhao, John Henry Wells, and Kenneth W. McMillin.*

(Continued)

*Primary Examiner* — Steven Leff
(74) *Attorney, Agent, or Firm* — The Marbury Law Group PLLC (57) ABSTRACT

Disclosed are systems and methods useful in extending the storage-life of foodstuff such as fresh fish. The methods can be used to transport or store the foodstuff for an extended period of time. The methods preferably use a low oxygen gas source to maintain a reduced oxygen level in the environment surrounding the foodstuff.

15 Claims, 3 Drawing Sheets

(56) References Cited

U.S. PATENT DOCUMENTS

| | | | |
|---|---|---|---|
| 5,457,963 A | | 10/1995 | Cahill-O'Brien et al. |
| 5,647,970 A | | 7/1997 | Arata |
| 6,013,385 A | | 1/2000 | DuBose |
| 6,023,915 A | * | 2/2000 | Colombo ................. 53/432 |
| 6,054,161 A | * | 4/2000 | Palmer .................. 426/312 |
| 6,125,613 A | * | 10/2000 | Eberhardt et al. .......... 53/432 |
| 6,171,368 B1 | | 1/2001 | Maget et al. |
| 6,179,986 B1 | | 1/2001 | Swette et al. |
| 6,180,146 B1 | | 1/2001 | Del Gallo et al. |
| 6,230,614 B1 | | 5/2001 | Del Gallo et al. |
| 6,256,905 B1 | | 7/2001 | White |
| 6,430,467 B1 | * | 8/2002 | D'Amelio et al. ......... 700/213 |
| 6,562,258 B1 | | 5/2003 | Elsome et al. |
| 6,808,837 B2 | | 10/2004 | Hirsch |
| 6,941,727 B2 | | 9/2005 | Villers et al. |
| 7,014,898 B2 | | 3/2006 | Ekman et al. |
| 7,739,947 B2 | | 6/2010 | Hoffjann et al. |
| 2004/0031240 A1 | | 2/2004 | Villers et al. |
| 2005/0074531 A1 | * | 4/2005 | Patterson ................. 426/129 |
| 2006/0073244 A1 | * | 4/2006 | Brackenridge et al. ...... 426/129 |
| 2006/0105219 A1 | | 5/2006 | Anderson |
| 2006/0127734 A1 | | 6/2006 | McLean et al. |
| 2007/0012703 A1 | * | 1/2007 | Owensby ................. 220/669 |
| 2007/0077470 A1 | | 4/2007 | Adams et al. |
| 2007/0077480 A1 | | 4/2007 | Curello et al. |
| 2008/0003334 A1 | | 1/2008 | Bell et al. |
| 2008/0145721 A1 | | 6/2008 | Shapiro et al. |
| 2009/0081493 A1 | | 3/2009 | Schrooten et al. |
| 2010/0159349 A1 | | 6/2010 | Highgate et al. |
| 2011/0151070 A1 | | 6/2011 | Bell |

FOREIGN PATENT DOCUMENTS

| | | |
|---|---|---|
| JP | 09-201182 | 8/1997 |
| JP | 2004-095515 | 3/2004 |
| WO | WO 2008/005810 | 1/2008 |
| WO | WO2008005810 A2 | 1/2008 |
| WO | WO2011053676 A2 | 5/2011 |

OTHER PUBLICATIONS

Farber, J. M., "Microbiological aspects of modified-atmosphere packaging technology: a review." J. Food Protect. (1991) 54:58-70.

Eva Tallaksen, "Scientist: GFF 30-day claim must be taken 'with pinch of salt,'" in IntraFish Media AS (Apr. 26, 2011).

Declaration of Laurence D. Bell dated Oct. 26, 2011, for U.S. Appl. No. 11/769,944.

U.S. Appl. No. 13/498,850, filed Jun. 28, 2012, Bell.

Eurasian Patent Organization Office Action for Application No. 201290214/31 (6 pages).

Eurasian Patent Organization Office Action for Application No. 201290214/31, dated Jan. 27, 2016, (5 pages).

Japanese Pre-Appeal Notice for JP 2015-019704, dated Feb. 9, 2016, 1page.

Chinese Notification of Reexamination for CN Patent Application No. 201080048445.7, issued Jul. 6, 2016, with English language translation, 17 pages.

* cited by examiner

SYSTEM AND METHOD FOR MAINTAINING PERISHABLE FOODS

CROSS REFERENCE TO RELATED APPLICATIONS

This application claims the benefit of Provisional Patent Application Ser. No. 61/256,868 filed on Oct. 30, 2009, which is incorporated herein by reference in its entirety.

FIELD OF THE INVENTION

This invention relates to systems and methods for increasing the storage-life of oxidatively-degradable foodstuffs such as fresh fish.

BACKGROUND

The storage-life of oxidatively-degradable foodstuffs such as fish, meat, poultry, bakery goods, fruits, grains, and vegetables is limited in the presence of a normal atmospheric environment. The presence of oxygen at levels found in a normal atmospheric environment leads to changes in odor, flavor, color, and texture resulting in an overall deterioration in quality of the foods either by chemical effect or by growth of aerobic spoilage microorganisms.

Modified atmosphere packaging (MAP) has been used to improve storage-life and safety of stored foods by inhibition of spoilage organisms and pathogens. MAP is the replacement of the normal atmospheric environment in a food storage pack with a single gas or a mixture of gases. The gases used in MAP are most often combinations of oxygen ($O_2$), nitrogen ($N_2$), and carbon dioxide ($CO_2$). In most cases, the bacteriostatic effect is obtained by a combination of decreased $O_2$ and increased $CO_2$ concentrations. Farber, J. M. 1991. Microbiological aspects of modified-atmosphere packaging technology: a review. J. Food Protect. 54:58-70.

In traditional MAP systems, the MAP gas composition is not manipulated after the initial replacement of the normal atmospheric environment. Thus, the composition of the gases present in the food pack is likely to change over time. Changes in the gas portion of the packaging can be due to diffusion of gases into and out of the product, diffusion of gases into and out of the food pack, and the effects of microbiological metabolism. In certain cases, the foodstuff will absorb carbon dioxide ($CO_2$) reducing the amount of $CO_2$ in the gas portion of the packaging with a concomitant increase in the relative amounts of other gases such as oxygen. Carbon dioxide absorption can lead to a negative pressure in the tote creating a "vacuumizing" situation which could potentially damage the foodstuff by, e.g., reducing the carbon dioxide concentration below levels effective for inhibiting microbial spoilage of the foodstuff with corresponding increases in residual oxygen concentrations. Vacuumization caused by $CO_2$ absorption can also cause leakage, especially in rigid totes, resulting in failures.

These architectures, which are usually small in size, generally dictate a one-time (multiple gas flush event) as they do not have any valves or fittings to facilitate the initial or additional gas flushes after the initial gas flush process. Furthermore, multiple gas flushes are not economically viable due to the necessity of reasonable production throughput requirements. Since these architectures are generally small, easily handled packages (usually 40 pounds or less) the cost per pound to employ the MAP process is very high and resulting MAP gas mixture less than ideal for maximum shelf life extensions.

An improvement to the above is disclosed in U.S. Ser. No. 11/769,944 where a fuel cell is integrated with a tote comprising oxidatively degradable foodstuffs and an internal hydrogen source. The fuel cell operates to convert excess oxygen in the tote to water by reaction with hydrogen. Nevertheless, the totes of that application require a single gas flush prior to sealing the tote.

Thus, the art to date can be generally characterized as sealed systems which do or do not remove residue oxygen from the interior of the system by chemical, electrical or catalytic processes.

It would be beneficial to avoid the functional and economic deficiencies of existing processes for removing oxygen from such storage systems. And there is a need to remove residual oxygen from such storage systems.

SUMMARY OF THE INVENTION

This invention provides for methods for removing oxygen internal to a tote comprising an oxidatively degradable foodstuff without the need for the use of any chemical, electrical and/or catalytic processes.

In particular, this invention is predicated on the discovery that totes having appropriate architecture will permit flushing, optionally periodic flushing, of the tote with a low oxygen gas source such that any oxygen accumulating in the tote is flushed from the tote prior to reaching concentration levels that adversely affect the foodstuff. Accordingly, in one of its method aspects, there is provided a method for removing oxygen from a tote having oxidatively degradable foodstuff(s) which method comprises:

a) a tote having a sealable gas inlet port and a sealable gas outlet port both ports being positioned in the head space of the tote wherein the tote comprises a flexible, collapsible or expandable material which does not puncture when collapsing or expanding;

b) adding oxidatively degradable foodstuff(s) to said tote in an amount such that the inlet and outlet ports are not obstructed;

c) sealing the tote;

d) conducting one or more initial flushings of the tote with a low oxygen gas source by injecting a sufficient amount of such gas source into the tote through the inlet port while emitting gas through the outlet port so as to provide a low oxygen atmosphere in the tote and a gaseous head space of sufficient volume to permit absorption of gas into the foodstuff without increasing oxygen content in remaining gaseous head space in the tote to a level of above about 1500 ppm;

e) sealing the inlet and outlet ports; and f) optionally periodically flushing the tote with a low oxygen gas source such that after flushing there remains a sufficient gaseous head space to compensate for gas absorption into the foodstuff such that the oxygen concentration in the remaining gaseous head space does not exceed 1500 ppm at any given time.

In preferred embodiments, the tote does not contain any internal components to remove oxygen from the tote such as a fuel cell, a catalyst, and the like.

The oxidatively-degradable foodstuffs to be transported and/or stored are preferably fish. More preferably, the fish is fresh fish selected from the group consisting of salmon, tilapia, tuna, shrimp, trout, catfish, sea bream, sea bass, striped bass, red drum, pompano, haddock, hake, halibut, cod, and arctic char. Most preferably, the fresh fish to be transported and/or stored is salmon or tilapia.

The vertical architecture of the totes disclosed herein facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. In certain embodiments, no more than about 20% of the expansion of the tote is in the horizontal direction, with the remainder of the gaseous expansion being in the vertical direction thus creating the "head pressure" and head space height of the totes. The tote is configured to expand in a vertical manner creating an initial "head pressure". Initial tote head pressures can range from about 0.1 to about 1.0 inches of water column or more above atmospheric pressure. The flexible tote can be made more flexible in the vertical direction than in the horizontal by conventional methods, such as using more flexible material in the vertical direction.

Additionally, in some embodiments, the low oxygen gas source is any external gas source that can be adapted to provide the gas source to the inlet port of the tote. Preferably, the gas source is carbon dioxide and, more preferably, the carbon dioxide contains less than about 1500 ppm of oxygen. Still more preferably, the carbon dioxide to be injected into the tote contains less than about 100 ppm oxygen.

The tote, in some embodiments, further comprises a temperature control system external to the packaging module to maintain the temperature inside the module at a level sufficient to maintain freshness of the foodstuff.

Another aspect of the invention provides for a method for transporting and/or storing of oxidatively-degradable foodstuffs within the totes described above. The method comprises the steps of flushing oxygen from the tote with carbon dioxide containing less than 1500 ppm oxygen wherein the tote contains an oxidatively-degradable foodstuff thereby generating a reduced oxygen environment within the tote, sealing the tote, and optionally periodically flushing the tote with carbon dioxide to maintain the reduced oxygen environment within the tote, and transporting and/or storing the foodstuff in the tote wherein the tote comprises a flexible, collapsible or expandable material which does not puncture when collapsing or expanding.

In one embodiment, the oxygen removal process occurs before adding the foodstuff to the tote; in another embodiment it occurs after adding the foodstuff to the tote. In one embodiment, oxygen removal can be achieved by employing a gas flush via inlet and outlet ports preferably installed positioned in the head space of the tote. In some embodiments, multiple periodic gas flushes can be employed. The inlet and outlet ports are sealable such that after the tote is flushed with a low oxygen gas source, the interior of the tote is isolated. In one embodiment, the inlet and outlet ports are holes wherein one can simply cover and uncover the holes when gas flushing is required. In such an embodiment, the holes (inlet and outlet ports) can be covered using tape. This allows for the inlet and outlet ports to be sealed and unsealed periodically. This architecture facilitates the economical practice of employing multiple gas flushes over time to remove oxygen and elevate levels of the low oxygen gas, such as nitrogen and/or $CO_2$.

The method can be used in the transporting and/or storing the foodstuff for a time period up to 100 days. In certain embodiments, the method can be used for transporting and/or storing the foodstuff for a time period of more than 100 days. For example, the time period for storage is from between 5 and 50 days, or alternatively, from between 15 and 45 days. In some embodiments, the method further comprises maintaining a temperature in the tote sufficient to maintain freshness of the material during transport or storage.

In preferred embodiments, the method is performed so that the reduced oxygen environment comprises less than 2% oxygen, or alternatively, the reduced oxygen environment comprises less than 1.5% oxygen, or alternatively, the reduced oxygen environment comprises less than 1% oxygen, or alternatively, the reduced oxygen environment comprises less than 0.1% oxygen, or alternatively, the reduced oxygen environment comprises less than 0.01% oxygen.

The reduced oxygen environment comprises carbon dioxide, or in some cases, comprises carbon dioxide and nitrogen.

An alternative embodiment to maintain a reduced oxygen environment is disclosed in U.S. Provisional Patent Application Ser. No. 61/275,720, filed on Oct. 30, 2009, which is herein incorporated by reference in its entirety.

BRIEF DESCRIPTION OF THE DRAWINGS

This invention will be further described with reference being made to the accompanying drawings.

DETAILED DESCRIPTION

The present invention encompasses systems and methods useful for transporting and storing oxidatively-degradable foodstuffs. The systems and methods described herein allow for the removal of oxygen, for example, periodic removal of oxygen, from the atmospheric environment surrounding an oxidatively degradable foodstuff which is stored in an individual tote within a shipping container. In some embodiments, the food stuff is carbon dioxide absorbing oxidatively-degradable foodstuff.

The totes or packaging modules used in this invention, as described more completely below, preferably do not incorporate an integrated temperature control system but rather rely upon the temperature control system of the shipping container in which they are shipped. In addition, the tote or packaging module is designed to withstand or compensate for the internal pressure loss (or gain), such as non-oxygen (carbon dioxide) gas absorption by the foodstuff during transport and/or shipment by employing a flexible, collapsible or expandable material which does not puncture when collapsing or expanding and by further employing a gaseous head space within the tote that compensates for such absorption without creating a vacuum condition and/or permitting the oxygen content of the gas in the tote to exceed 1500 ppm.

The removal of oxygen during transport and/or storage allows for a controlled reduced oxygen environment that is suitable to maintain the freshness of the material for a prolonged period. As a result, oxidatively-degradable materials can be transported and/or stored for longer periods of time than are currently possible using conventional shipping and storage techniques. The methods described herein allow, for example, the use of shipping freighters to transport oxidatively-degradable materials, such as carbon dioxide absorbing oxidatively-degradable foodstuffs, for example fish, to markets that would normally only be served by more expensive air shipping.

In one embodiment, this invention provides systems and methods useful for extending the storage life of oxidatively-degradable foodstuffs. In a preferred embodiment, the oxidatively-degradable foodstuff is nonrespiratory. Nonrespiratory foodstuffs do not respire. That is to say that these foodstuffs do not take in oxygen with an associated release of carbon dioxide. Examples of nonrespiratory foodstuff include fresh or processed fish, meat (such as beef, pork, and lamb), poultry (such as chicken, turkey, and other wild and domestic fowl), and bakery goods (such as bread, tortillas, and pastries, packaged mixes use to generate bread and pastries, and grain-based snack foods). Preferred nonrespiratory foodstuff to be transported/and or stored by the systems and methods of this invention include fresh or processed fish, such as salmon, tilapia, tuna, shrimp, trout, catfish, sea bream, sea bass, striped bass, red drum, pompano, haddock, hake, halibut, cod, arctic char, shellfish, and other seafood. More preferably, the nonrespiratory foodstuff is fresh salmon or fresh tilapia, and most preferably the nonrespiratory foodstuff fresh Chilean Atlantic farmed salmon.

In general, the systems and methods of the invention involve a tote, the oxidatively-degradable foodstuff to be transported and/or stored, and a low oxygen gas source that periodically flushes the tote with a low oxygen gas, such as carbon dioxide, thus removing any available oxygen from inside the tote so as to control the gaseous environment surrounding the foodstuff at least for a portion of the storage and/or transportation period. In a preferred embodiment, the reduced oxygen environment within the tote is created by flushing the environment within the tote via application of a vacuum and/or introduction of a low oxygen gaseous source via an inlet port while the gas present in the interior of the tote is expelled through the outlet port. After flushing of the tote, the inlet and outlet ports are sealed, and the environment within the tote is a reduced oxygen environment. Optionally, the tote is then periodically flushed with carbon dioxide oxygen as needed throughout the duration of the transport and/or storage when oxygen is present to maintain the reduced oxygen environment within the packaging module, thus maintaining the freshness of the oxidatively-degradable material. In certain embodiments, an oxygen sensor is present internal to the tote in order to signal the need for flushing with carbon dioxide.

The term "low oxygen gas source" refers to gas sources containing less than a 1000 ppm oxygen; preferably, less than 100 ppm oxygen; and more preferably, less than 10 ppm oxygen. The low oxygen gaseous source is preferably comprised of $CO_2$ or mixture of gases containing $CO_2$ as one of its components. $CO_2$ is colorless, odorless, noncombustible, and bacteriostatic and it does not leave toxic residues on foods. In one embodiment, the low oxygen gaseous source is 100% $CO_2$. In another embodiment, the low oxygen gaseous source is a mixture of $CO_2$ and nitrogen or other inert gas. Examples of inert gases include, but are not limited to, argon, krypton, helium, nitric oxide, nitrous oxide, and xenon. The identity of the low oxygen gaseous source can be varied as suitable for the foodstuff and is well within the knowledge and skill of the art. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

As described above, the pressure-stable sealable tote of limited oxygen permeability comprises a flexible, collapsible or expandable material which does not puncture when collapsing or expanding or a tote comprising a rigid material. These totes are, in general, constructed of flexible cast or extruded plastic sheeting.

The flexible, collapsible or expandable tote materials for use in this invention are those having limited oxygen permeability. Materials of limited oxygen permeability preferably have an oxygen transmission rate (OTR) of less than 10 cubic centimeters/100 square inch/24 hours/atm, more preferable materials of limited oxygen permeability are materials having an OTR of less than 5 cubic centimeters/100 square inch/24 hours/atm, even more preferably materials of limited oxygen permeability materials having an OTR of less than 2 cubic centimeters/100 square inch/24 hours/atm; most preferably materials of limited oxygen permeability are materials having an OTR of less than 1 cubic centimeters/100 square inch/24 hours/atm. A non-exhaustive list of materials that can be used to make the flexible, collapsible or expandable tote is shown in Table 1.

TABLE 1

| MATERIAL | Moisture Vapor Transmission Rate (MVTR) (gm/100 sq. in./24 hours) | Oxygen Transmission Rate OTR (c.c./100 sq. in./24 hours/atm) |
| --- | --- | --- |
| Saran 1 mil | 0.2 | 0.8-1.1 |
| Saran HB 1 mil | 0.05 | 0.08 |
| Saranex 142 mil | 0.2 | 0.5 |
| Aclar 33C .75 mil (military grade) | 0.035 | 7 |
| Barex 210 1 mil | 4.5 | 0.7 |
| Polyester 48 Ga. | 2.8 | 9 |
| 50 M-30 Polyester Film | 2.8 | 9 |
| 50 M-30 PVDC Coated Polyester | 0.4 | 0.5 |
| Metallized Polyester 48 Ga. | 0.05 | 0.08-0.14 |
| Nylon 1 mil | 19-20 | 2.6 |
| Metallized Nylon 48 Ga. | 0.2 | 0.05 |
| PVDC-Nylon 1 mil | 0.2 | 0.5 |
| 250 K Cello | 0.5 | 0.5 |
| 195 MSBO Cello | 45-65 | 1-2 |
| LDPE 2 mil | 0.6 | 275 |
| Opp .9 mil | 0.45 | 80 |
| EVAL, Biax 60 Ga. | 2.6 | 0.03 |
| EVAL EF-E 1 mil | 1.4 | 0.21 |
| EVAL EF-F 1 mil | 3.8 | 0.025 |
| Benyl H 60 Ga | 0.7 | 0.4 |
| PVC 1 mil | 4-5 | 8-20 |
| Polycarbonate 1 mil | 9 | 160 |
| Polystyrene 1 mil | 7.2 | 4,800 |
| Pliofilm 1 mil | 1.7 | 660 |

The tote may further comprises one or more low oxygen gas sources exterior and in gaseous contact with the tote via an inlet port to periodically flush the tote, thus removing any oxygen from the environment within the tote via one or more outlet ports. Oxygen may accumulate in the tote during use by, for example, diffusion through the tote through the material of limited oxygen permeability or at the seal of the tote. Oxygen may also be released by the oxidatively-degradable foodstuff within the tote or from containers in which the foodstuff is packaged. In a preferred embodiment, the carbon dioxide is a carbon dioxide gas having less than 10 ppm oxygen.

The tote can be configured to provide access for tubes, wires, and the like such that the external gases, such as carbon dioxide, can be introduced via an inlet port. The inlet port is provided using fittings that are sealable and can maintain the low oxygen environment within the tote.

In order to compensate for the pressure differential that occurs during a prolonged transport or storage, the tote contains a head space volume that allows for absorption of gases, such as carbon dioxide. The term "head space" is intended to refer to the amount of excess gaseous volume of the tote after the tote is filled with carbon dioxide absorbing oxidatively-degradable foodstuff. In some embodiments, the head space is from about 30% to about 95% the internal volume of the tote. In other embodiments, the head space is from about 35% to about 40% of the internal volume of the tote, or alternatively, the head space is about 30% to about 35% of the internal volume of the tote, or alternatively, the head space is about 35% of the internal volume of the tote. It is contemplated that multiple flushes with the low oxygen gas would allow for gas absorption by the foodstuff, thus alleviating the need for as much head space. However, it is also contemplated that with a large scale shipment (i.e. 2,000 pounds foodstuff packaged in multiple cartons) a headspace may be necessary as gas absorption requires too many days to be practical for shipping purposes.

In certain embodiments, the totes are able to accommodate a very large headspace (primarily to accommodate $CO_2$ absorption and protect against/delay air leakage), such that the headspace in combination with multiple initial gas flushes would require no continuous oxygen monitoring or further periodic gas flushing beyond the initial multiple gas flushes. It is contemplated that the initial gas flushes can proceed periodically during the first 72 hours of the tote being sealed with the oxidatively degradable foodstuff. Alternatively, the initial gas flushes can proceed during the first 72 hours or less of the tote being sealed, or alternatively, the first 60 hours, or alternatively, the first 48 hours, or alternatively, the first 24 hours.

The vertical architecture of the totes disclosed herein facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. In certain embodiments, no more than about 20% of the expansion of the tote is in the horizontal direction, with the remainder of the gaseous expansion being in the vertical direction thus creating the "head pressure" and head space height of the totes. The tote is configured to expand in a vertical manner creating an initial "head pressure". Initial tote head pressures can range from about 0.1 to about 1.0 inches of water column or more above atmospheric pressure.

In certain embodiments, the low oxygen gas source is programmed to flush the interior environment of the tote at predetermined time intervals throughout the duration of the transport and/or storage. In other embodiments, the low oxygen gas source is programmed to flush the interior environment of the tote when the oxygen level of the internal tote environment exceeds a level which is detrimental to the foodstuff. In the beginning of the transport and/or storage, oxygen may be released by the oxidatively-degradable foodstuff within the tote or from containers in which the foodstuff is packaged.

In a preferred embodiment, the tote further comprises an indicator which would alert one to the fact that the oxygen level in the tote had exceeded the levels described as a reduced oxygen environment. In certain embodiments, low oxygen gas source is programmed to flush the interior environment of the tote when the level of oxygen in the reduced oxygen environment is about 2% oxygen, more preferably about 1.5%, more preferably about 1%, more preferably about 0.1%, most preferably about 0.01% oxygen, or when the level of oxygen exceeds about 1500 ppm oxygen. In a particular embodiment, a oxygen sensor, for example, a trace oxygen sensor (Teledyne), is used to monitor the level of oxygen present in the tote environment.

The tote optionally contains monitors to monitor oxygen levels and temperature. In a particular embodiment, an oxygen sensor, for example, a trace oxygen sensor (Teledyne), is used to monitor the level of oxygen present in the tote environment.

In some embodiments, the tote comprises a box comprising devices which such as an oxygen indicator which alerts one when the oxygen level in the tote exceeds the levels described as a reduced oxygen environment, and/or monitors to monitor oxygen levels and temperature, etc. The box further optionally comprises a visible indicator, such as an LED light, which indicates problems of the devices in the box so that the problematic device or the box can be immediately replaced before sealing the tote. This facilitates rapid detection of any failure by unskilled labor and allows for rapid turn-around of boxes into service with minimal testing. The box also alerts users on arrival of system if oxygen or temperature (time and temperature) limits are exceeded, preferably, using wireless communication, such as radio frequency transmission, along with a visible indicator, such as a red LED light.

The totes are configured so as to be suitable for transporting and/or storing in a shipping freighter. A shipping freighter means any container that can be used to transport and/or store the system including, but not limited to, an ocean shipping freighter, a trucking shipping freighter (such as a tractor-trailer), a railroad car, and an airplane capable of transporting cargo load. In some embodiments, the tote further comprises a device for monitoring and/or logging the temperature of the system or container. Such devices are commercially available from manufacturers including Sensitech, Temptale, Logtag, Dickson, Marathon, Testo, and Hobo.

As noted above, one or more totes can be used in a single shipping freighter and, accordingly, each can be configured to have a different gaseous environment as well as a different foodstuff. Further, at delivery, opening of the shipping freighter does not result in disruption of the internal atmosphere of any tote and, accordingly, one or more of the totes can be delivered at one site and the others at different site(s). The size of each tote can be configured prior to shipment to correspond to the quantity of foodstuff desired by each vendee. As such, the totes can preferably be sized to contain as little as a few ounces of foodstuff to as much as, or greater than, 50,000 pounds, or 1 ton of foodstuff. In addition, the vertical architecture facilitates minimizing horizontal space requirements for shipping the maximum number of pallets side-by-side. Embodiments that spread the headspace out horizontally may not be as economically viable at a large scale in addition to not enjoying the leak resistance as long as the headspace remains positive. The number of packaging modules per system depends both on the size of the shipping freighter used to transport and/or store the system and the size of the packaging modules. Specific examples of the number of packaging modules per system is set forth in the description of specific embodiments below.

The invention provides for methods for transporting and/or storing oxidatively-degradable foodstuff. The methods utilize the totes as described above. In a preferred embodiment, the invention comprises a method for removing oxygen from a tote having oxidatively degradable foodstuff(s) which method comprises:

a) a tote having a sealable gas inlet port and a sealable gas outlet port both ports being positioned in the head space of the tote wherein the tote comprises a flexible, collapsible or expandable material which does not puncture when collapsing or expanding;

b) adding oxidatively degradable foodstuff(s) to said tote in an amount such that the inlet and outlet ports are not obstructed;

c) sealing the tote;

d) conducting one or more initial flushings of the tote with a low oxygen gas source by injecting a sufficient amount of such gas source into the tote through the inlet port while emitting gas through the outlet port so as to provide a low oxygen atmosphere in the tote and a gaseous head space of sufficient volume to permit absorption of gas into the foodstuff without increasing oxygen content in remaining gaseous head space in the tote to a level of above about 1500 ppm;

e) sealing the inlet and outlet ports; and f) optionally periodically flushing the tote with a low oxygen gas source such that after flushing there remains a sufficient gaseous head space to compensate for gas absorption into the foodstuff such that the oxygen concentration in the remaining gaseous head space does not exceed 1500 ppm at any given time.

The low oxygen gaseous source is preferably comprised of $CO_2$ or mixture of gases containing $CO_2$ as one of its components. In one particular embodiment, the low oxygen gaseous source is 100% $CO_2$. In another embodiment, the low oxygen gaseous source is a mixture of $CO_2$ and nitrogen or other inert gas. Examples of inert gases include, but are not limited to, argon, krypton, helium, nitric oxide, nitrous oxide, and xenon. The identity of the low oxygen gaseous source can be varied as suitable for the foodstuff. For example, the low oxygen gaseous source used for transport and storage of salmon is preferably 100% $CO_2$. Other fish, such as tilapia are preferably stored or shipped using 60% $CO_2$ and 40% nitrogen as the low oxygen gaseous source.

After a period of time, the oxygen levels present in the tote remain at a reduced level because gaseous exchange between the foodstuff and the tote environment reached a natural minimization or cessation. In one embodiment, the low oxygen gas source can be programmed to cease operation after an initial period time that is sufficient to allow a natural minimization or cessation of gaseous exchange. Preferably, the low oxygen gas source is programmed to cease operation after a period of between around 0.5 and 50 hours, more preferably, the low oxygen gas source is programmed to cease operation after a period of between around 1 and 25 hours; more preferably, the low oxygen gas source is programmed to cease operation after a period of between around 2 and 15 hours; even more preferably, the low oxygen gas source is programmed to cease operation after a period of between around 3 and 10 hours.

Alternatively, the low oxygen gas source can be programmed to cease operation when the oxygen level reaches and is maintained below a predetermined level. In one embodiment, the oxygen level reaches and is maintained below 5% oxygen v/v, or alternatively, the oxygen level reaches and is maintained below 1% oxygen v/v, or alternatively, the oxygen level reaches and is maintained below 0.1% oxygen v/v, or alternatively, the oxygen level reaches and is maintained below about 1500 ppm oxygen.

The totes, packaging modules and/or the system are then used to transport and/or store the oxidatively-degradable material, for example the carbon dioxide absorbing oxidatively-degradable foodstuff, for an extended time period. Preferably, the extended time period is from between 1 and 100 days; more preferably the extended time period is from between 5 and 50 days, even more preferably the extended time period is from between 15 and 45 days.

The methods described herein allow for the oxidatively-degradable material to be transported or stored for a prolonged period of time not possible using standard MAP technology or other standard food storage methods. The prolonged period will vary according to the nature of the oxidatively-degradable material. It is contemplated that using the methods disclosed herein, fresh salmon can be stored or transported in a preserved manner for a prolonged period of at least 30 days. In contrast, fresh salmon can only be stored or transported in a preserved manner for a period of from between 10-20 days in the absence of a reduced oxygen environment.

EXAMPLE

Figure 1:
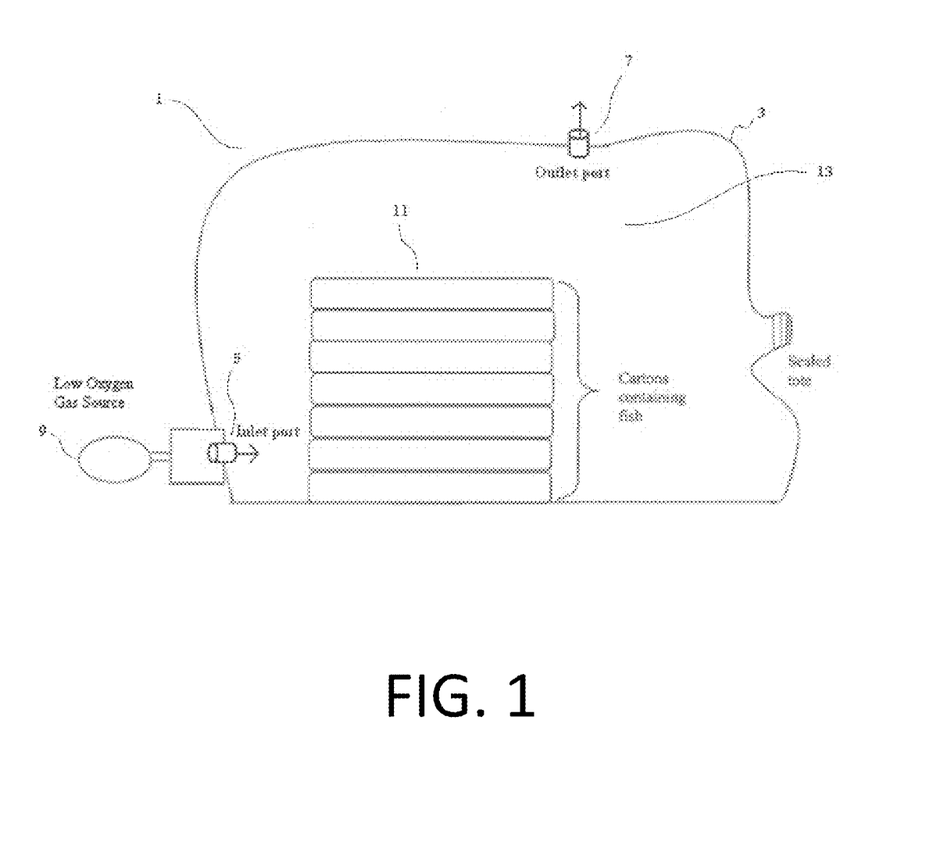
FIG. 1 is a schematic of a tote used to transport or store oxidatively-degradable material.
Figure 2:
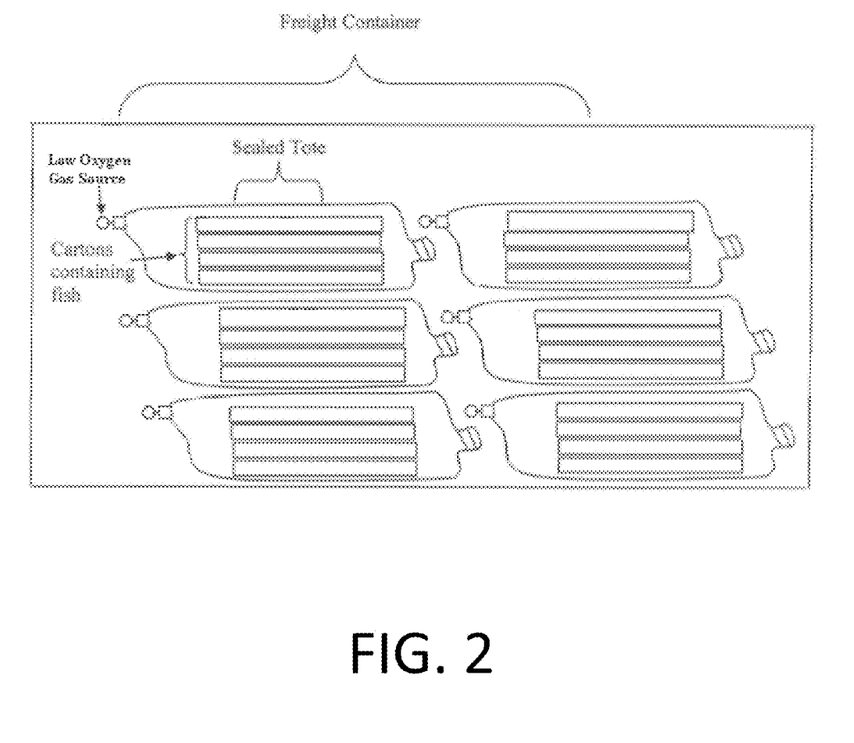
FIG. 2 is a schematic of a system comprising a plurality of the totes in a shipping freighter.

Reference is made to FIG. 1, wherein tote 1 comprises a flexible oxygen impermeable barrier layer 3, inlet port 5 and outlet port 7, wherein the inlet port 5 is connected to a low oxygen gas source 9. Tote 1 contains foodstuff (e.g. fish) 11 and head space 13. Headspace 13 provides for a significant oversizing of the tote relative to the foodstuff 11 contained therein. In one embodiment, the oversizing provides for a head space of up to 40% volume percent of the tote.

This unique architecture disclosed herein includes major over-sizing of the tote 1 and head space 13 (see FIG. 3), in-flow (inlet) and vent (outlet) openings and gas flushing (as opposed to vacuum, followed by gas injection). Also, the tote is loaded by placing oxidatively degradable foodstuffs inside the tote with the tote positioned on a pallet with the factory sealed end (closed end) on the bottom (as opposed to having the factory seal is the top as the tote is placed over the top of the foodstuffs). The tote is then be heat sealed across the top of the tote (above the foodstuffs) after the foodstuffs are stacked or positioned "inside" the tote, sitting on a pallet. In-flow (inlet) and vent (outlet) openings are employed in the tote to facilitate gas flushing through the tote to lower oxygen. The in-flow of gas is positioned to be at the bottom of the pallet with the out-flow at the top on the opposite side (to encourage top to bottom flushing). Valves or holes (taped over) can be used for in-flow and/or out-flow. When $CO_2$ is used, which is much heavier than air, one can flow $CO_2$ slowly into the bottom of the tote such that the tote fills up much like a swimming pool with the $CO_2$ pushing the air up and out the vent. The last step after flushing is to inflate the head space area of the tote to maximize the head pressure and the head space of the tote before closing the vent (outlet port) and shutting off the in-flow (inlet) of low oxygen gas(es). After the $CO_2$ level reaches 90+%, the gas flow is stopped and the tote held for several hours up to a day or more to allow for trapped oxygen to diffuse out of the packaging and perishable contents such that a subsequent flush/fill will remove the majority of that residual oxygen. The major oversized headspace remains necessary due to the long duration of complete $CO_2$ absorption and the extra reservoir (and slight positive pressure) created by the extra headspace to discourage leakage of air into the tote (should a leak exist).

Figure 3:
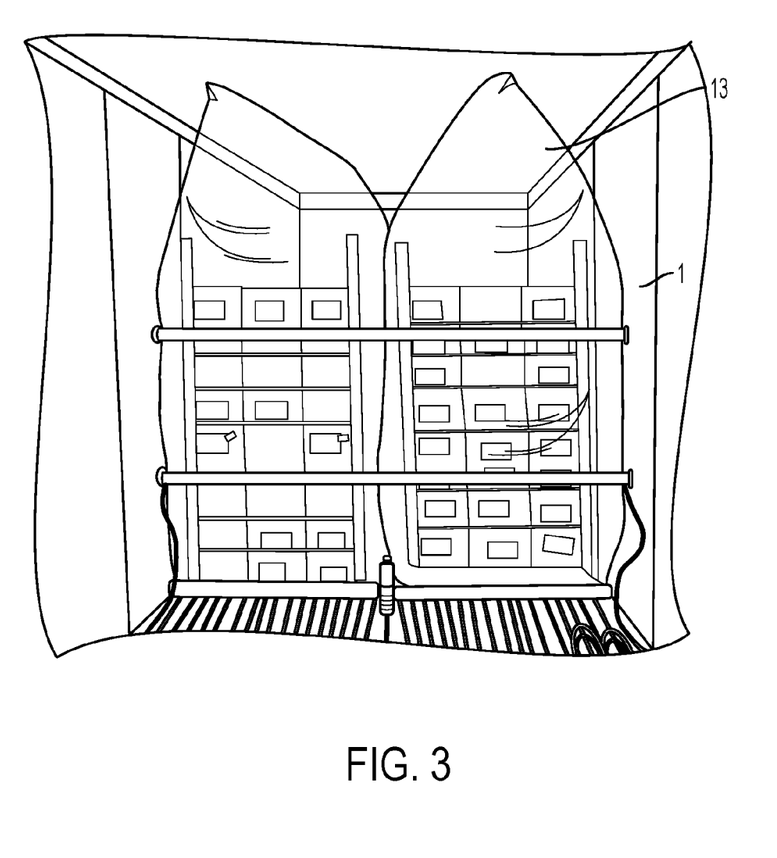
FIG. 3 is a picture of totes loaded with oxidatively-degradable material in a shipping freighter.

As shown in FIG. 3, the tote 1 also utilizes a "head pressure", which is created by the maximized head space 13 height of the flexible tote. It is believed that the height of $CO_2$ confined in the vertical tote creates positive pressure, much like an inflated balloon. Although in FIG. 3 the tote is not literally pressurized via stretching, it could be by constructing the tote from a suitable material. In one example, the tote is inflated to a pressure of about 2.2 inches of water column or more above atmospheric pressure and the decay down to about 1.8 inches of water column is timed to detect leaks. After the tote passes the leak test (6 minutes or more) the tote is then gas flushed and it is contemplated that the final gas flush results in about 0.5 or less inches of water column. The tote is "ballooned" at that point. The plastic is configured to expand in a vertical manner and such methods and materials are known in the art. Initial tote head pressures can range from about 0.1 to about 1.0 inches of water column or more above atmospheric pressure. In addition, the vertical architecture facilitates minimizing horizontal space requirements for shipping the maximum number of pallets side-by-side. No more than 20% of the expansion of the tote is in the horizontal direction, with the remainder of the gaseous expansion being in the vertical direction thus creating the "head pressure" and head space height.

In certain embodiments, the totes are able to accommodate a very large headspace (primarily to accommodate $CO_2$ absorption and protect against/delay air leakage), such that the headspace in combination with multiple initial gas flushes would require no continuous oxygen monitoring or further periodic gas flushing beyond the initial multiple gas flushes. It is contemplated that the initial gas flushes can proceed periodically during the first 72 hours of the tote being sealed with the oxidatively degradable foodstuff. Alternatively, the initial gas flushes can proceed during the first 72 hours or less of the tote being sealed, or alternatively, the first 60 hours, or alternatively, the first 48 hours, or alternatively, the first 24 hours.

What is claimed is:

1. A method for removing oxygen from a tote having oxidatively degradable foodstuff(s), wherein the foodstuff is fresh fish, which fish absorb gas during storage and/or transportation which method comprises:
   a) adding the foodstuff to a tote having a sealable gas inlet port and a sealable gas outlet port;
   b) sealing the tote;
   c) connecting the inlet port to an inert gas source and opening the outlet port of the otherwise sealed tote;
   d) conducting one or more initial flushings of the tote with an inert gas from the inert gas source during a first flushing period prior to transportation and/or storage the degradable foodstuff(s), the one or more flushings comprising injecting a sufficient amount of the inert gas into the tote through the inlet port while removing gas through the outlet port to remove residual oxygen in the foodstuff(s) such that the one or more flushings provide a reduced oxygen environment in the tote and an initial gaseous head space of sufficient volume to permit absorption of the inert gas into the foodstuff without increasing oxygen content in the remaining gaseous head space in the tote to a level of above about 1500 ppm,
   wherein the inert gas source ceases operation after a time period to conclude the first flushing period in about 0.5 to about 50 hours such that the first flushing period is sufficient to allow a natural minimization or cessation of gaseous exchange within the tote between the foodstuff and the environment of the tote;
   e) sealing the inlet and outlet ports prior to transportation; and
   f) periodically flushing the tote during transportation and/or storage to maintain the oxygen content in the remaining gaseous head space to a level below about 1500 ppm,
   wherein the tote further comprises an oxygen sensor located internal to the tote and wherein the steps of periodically flushing the tote during transportation and/or storage occur when the oxygen sensor signals a need for flushing.

2. The method of claim 1, wherein the head space of the tote comprises from about 30 to about 40% of the internal volume of the tote.

3. The method of claim 1, wherein the inert gas comprises carbon dioxide.

4. The method of claim 1, wherein the reduced oxygen environment comprises carbon dioxide.

5. The method of claim 1, wherein the reduced oxygen environment comprises nitrogen.

6. The method of claim 1, wherein the reduced oxygen environment comprises carbon dioxide and nitrogen.

7. The method of claim 1, wherein the inert gas is selected from the group consisting of carbon dioxide, nitrogen, argon, krypton, helium, nitric oxide, nitrous oxide, and xenon, or a mixture thereof.

8. The method of claim 7, wherein the inert gas is carbon dioxide, nitrogen, or a mixture thereof.

9. The method of claim 1, wherein the fresh fish is salmon or tilapia.

10. The method of claim 1, wherein the tote comprises an initial "head pressure" from about 0.1 to about 1.0 inches of water column above atmospheric pressure.

11. The method of claim 1, wherein:
the fresh fish is selected from the group consisting of salmon, tilapia, tuna, shrimp, trout, catfish, sea bream, sea bass, striped bass, red drum, pompano, haddock, hake, halibut, cod, and arctic char; and
the tote comprises a flexible, collapsible or expandable material which does not puncture when collapsing or expanding.

12. The method of claim 1, wherein periodically flushing the tote during transportation and/or storage comprises periodically flushing the tote during the transportation and during the storage.

13. The method of claim 1, wherein periodically flushing the tote during transportation and/or storage comprises periodically flushing the tote during the storage.

14. The method of claim 1, wherein periodically flushing the tote during transportation and/or storage comprises periodically flushing the tote during the transportation.

15. The method of claim 14, wherein periodically flushing the tote during the transportation comprises periodically flushing the tote during the transportation in at least one of an ocean shipping freighter, a trucking shipping freighter, a railroad car or an airplane.

* * * * *